(No Model.) 2 Sheets—Sheet 1.
H. F. PARSHALL.
SYNCHRONIZING MECHANISM.
No. 584,062. Patented June 8, 1897.
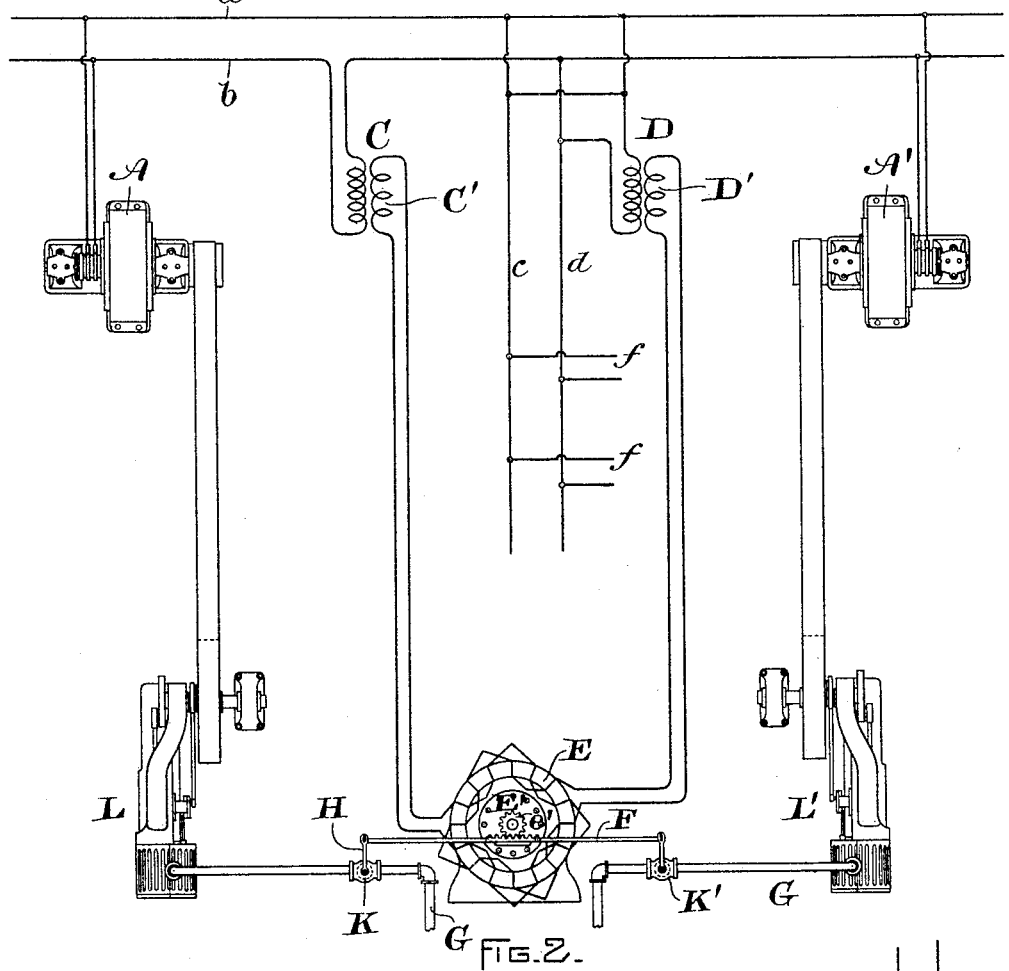
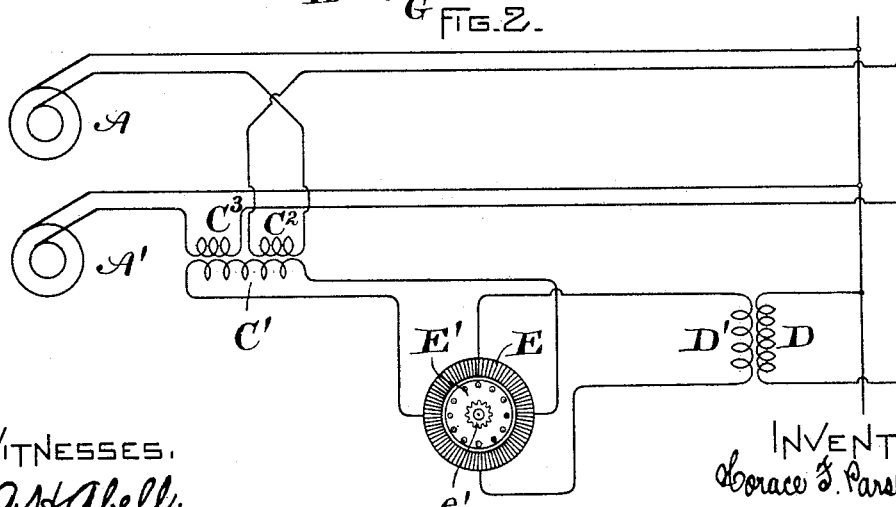
Witnesses:
A. H. Abell.
A. T. Macdonald.
Inventor.
Horace F. Parshall, by
Geo. R. Blodgett,
atty.

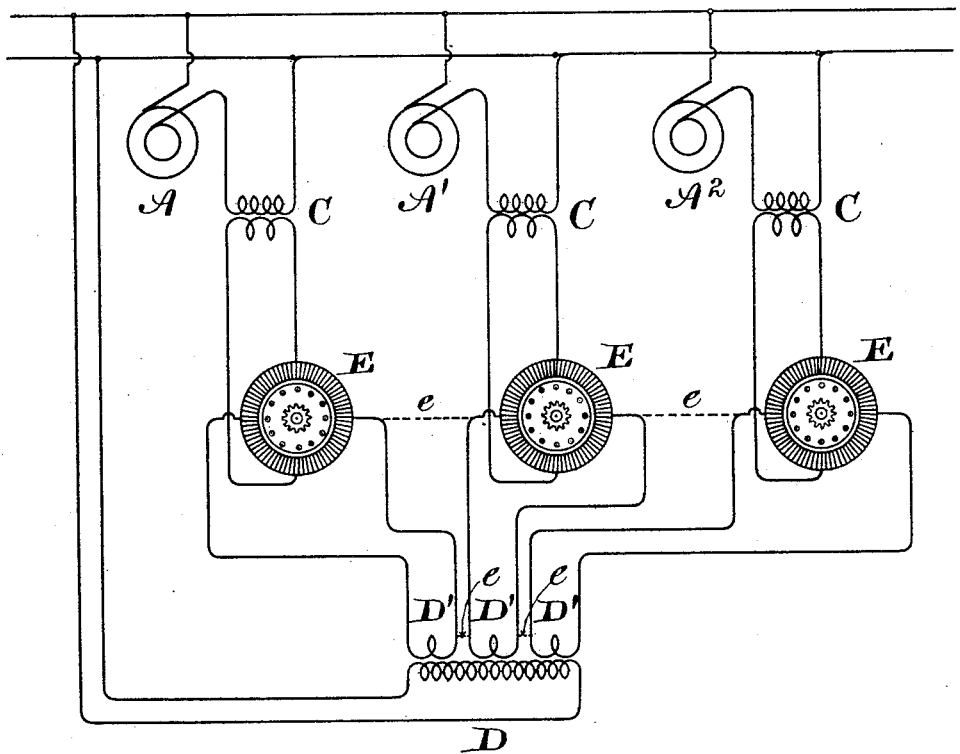

UNITED STATES PATENT OFFICE.

HORACE F. PARSHALL, OF LONDON, ENGLAND, ASSIGNOR TO THE GENERAL ELECTRIC COMPANY, OF NEW YORK.

SYNCHRONIZING MECHANISM.

SPECIFICATION forming part of Letters Patent No. 584,062, dated June 8, 1897.

Application filed December 31, 1895. Serial No. 573,906. (No model.)

*To all whom it may concern:*

Be it known that I, HORACE F. PARSHALL, a citizen of the United States, temporarily residing in London, England, have invented certain new and useful Improvements in Synchronizing Mechanisms, (Case No. 288,) of which the following is a specification.

My invention relates to devices for synchronizing the phase relation of alternating-current dynamo-electric machines connected in parallel, and has for its object to accomplish this purpose by automatically regulating the engine or prime mover connected to the various machines. I therefore connect a suitable regulating-valve, which may be the throttle or a specially-designed controller, the particular type being unimportant, to a device more particularly described hereinafter, but which I may briefly call a "watt mechanism," provided with two sets of coils upon an inducing member or field-magnet. One of these sets of coils or windings is supplied with current from the main between the two machines to be kept in synchronism, preferably from a series transformer in that main. The other winding is supplied by a shunt between the circuit-mains, also most conveniently employing a transformer. Within the field of force generated by these coils is rotatably mounted a suitable induced member or "armature," using the term to designate any structure capable of transmitting torque in such a mechanism as the one described. To this armature is connected the engine-valve before referred to, the connection being made by any preferred means. The method of operation will be more particularly described hereinafter.

The device above described is capable of modification in several ways, which will be pointed out later.

In running alternators in parallel not only do difficulties arise in starting an idle machine so as to throw it into circuit only when in proper phase relation, but when the load changes upon a number of machines already running it is difficult to make it divide properly without throwing the dynamos out of phase to a greater or less extent. The apparatus which I have devised is especially useful in this contingency, inasmuch as it is not only automatic in its response to changing conditions, but as it operates only by variant phase relations the potential regulation of the machines to effect the proper distribution of load may be independently performed by hand or otherwise, the apparatus of my invention taking care of the phase relation, so that but little energy is wasted by the electromotive forces of the machines opposing one another.

The drawings annexed show in diagram several ways of embodying my invention.

Figure 1 shows the device described in my statement of invention. Fig. 2 is a modified form. Fig. 3 is a further modification particularly adapted to a number of machines.

In Fig. 1, A A' are the alternators, supplying in parallel through the mains $a\ b$, the bus-bars $c\ d$, and the feeders $f\ f$. C D are transformers, C being in series with the main $b$ and D being in shunt to the main circuit. C' is the secondary coil of the transformer C, in circuit with one set of the coils upon the inducing member or field-magnet E of the watt mechanism already referred to. To the other set of these coils energy is supplied from the secondary D' of the transformer D. The inductance and resistance of the circuits containing the secondaries and inducing member E are so selected that in their normal condition no relative difference of phase exists between the energy developed in the respective sets of coils upon the inducing member.

E' is the induced body or armature, of any type suitable for the purpose. As instances of proper constructions I may mention a laminated iron "shuttle," a so-called "squirrel-cage," or a closed-circuited armature of any other convenient form. Upon the shaft about which the member E' rotates is mounted a pinion $e'$, meshing with the rack attached to the bar F. This latter bar is connected to a lever H, controlling the valve K, by which the flow of steam through the pipe G is regulated. Another valve K' is governed in reverse relation to the valve K by the other end of the bar F. By this means the engines L L' of the two machines A A' may be simultaneously and inversely regulated, so that the racing machine will be throttled, while the lagging or overloaded engine will be given more steam.

Referring now to Fig. 2, I show a modified form of my invention which may be employed, both of the particular arrangements illustrated being best adapted to two machines. In this figure the reference-letters indicate the same parts as before, the connecting part F being omitted, as its function would be well understood. The transformer C, however, is provided with two coils, one coil, $C^3$, being in the lead from the machine $A'$, the other, $C^2$, being in that from the machine A. This latter coil has its terminals reversed, and consequently its electromotive force is opposed to that in the coil C. The electromotive force generated, therefore, in the coil $C'$ in circuit with the inducing member E is normally zero; but when one or the other of the machines leads the current induced in $C'$ would correspond to the difference of phase between the two machines and the actions indicated in Fig. 1 would take place.

The operation of the device shown in Fig. 1 may be briefly stated as follows: During the normal operation of the machines, although the entire current from the machine A, Fig. 1, passes through the transformer C and the entire potential across the system is measured by the transformer D, the coils are, as before stated, so wound that their resistance and inductance are such that no difference of phase exists in the two windings upon the inducing member. There is therefore no tendency to start in the induced member $E'$ and the apparatus remains stationary. Assume, however, that the machine A races. The electromotive forces in the transformer C become leading or out of phase with those in D. A difference of phase is then set up in the two windings of the field-magnet and the armature $E'$ responds and changes the position of the valves already referred to. Should the machine $A'$ speed up or the machine A drop behind, the reverse condition takes place—that is to say, the electromotive forces in the transformer C, instead of leading, would lag behind those in the transformer D, and the armature $E'$ would then tend to move in the opposite direction. Normally these motions would be slight, the machines naturally tending to keep in phase. In addition, the effects of hysteresis and self-induction in the two circuits act to some extent like a mechanical dash-pot and tend to prevent responses to small and comparatively negligible differences which would ordinarily quickly correct themselves.

The operation of the form shown in Fig. 2 will be readily understood. If the currents in $C^2$ and $C^3$ are in phase with each other, then as one of the coils is reversed the magneto-motive forces produced by these two coils will be one hundred and eighty degrees from each other, and as the currents in the two coils are supposed to be equal the magneto-motive forces will be equal and opposite and the electromotive force generated in the coil $C'$ will be zero. The field in E will then be single phase only and will not tend to rotate the armature E. If now one of the currents should lag slightly, the two magneto-motive forces would cease to be in exact opposition and an electromotive force intermediate in phase between them would be produced in the coil $C'$. This electromotive force will be nearly ninety degrees from the electromotive force of $D'$ if the transformers are properly designed, and a rotary field will be produced in E, which will effect the desired rotation.

In Fig. 3 I illustrate the application of my invention to a station in which more than two machines are employed. In this case, as may be observed from the figure, it would not be necessary to employ individual shunt-transformers for each of the watt organisms. I therefore illustrate a single transformer D, with a divided secondary coil, the coil supplying all of the shunt-windings upon the various inducing members E E E. In the lead of each of the machines, however, is a series transformer C, and each of the inducing members E is in the circuit with one of the separate series transformers. In this case the engine connected to each dynamo is controlled by one of the watt organisms or regulators, and the inverse regulation of the engines possible with the two machines is unnecessary and undesirable, on account of the complication required to effect the connections. Although I prefer to employ a single shunt-transformer, my invention is not limited in this respect, as individual transformers might be used, if desired, in the manner shown in Fig. 1. So, also, a single coil might be used as the secondary of the single shunt-transformer required and the various inducing members E E E might be connected to it in series or in parallel, the winding and size of wire being properly selected so as to normally maintain the electromotive forces in proper phase with those of the series coils, these changes being well understood by those skilled in the art.

The arrangement just described is indicated by the dotted lines in Fig. 3 at $e\ e$, the divided secondary coils $D'\ D'$ being shown as united and the watt organisms E E being connected thereto.

What I claim as new, and desire to secure by Letters Patent of the United States, is—

1. The art of maintaining synchronism of alternating generators separately operated in parallel, which consists in controlling the speeds of the different generators by means acting upon their prime movers and actuated by the variations of phase relation between the generators, as set forth.

2. A plurality of alternating dynamos separately operated in parallel upon a common circuit forming their only electrical connection, a regulating apparatus normally idle when the machines are in phase, but actuated by a variation of their phase relation, and means operated by the regulating apparatus for controlling the prime movers of the generators and thereby the relative speeds of the dynamos and their phase relation.

3. The combination with a plurality of alternating dynamos operated in parallel on a common circuit, of a regulating apparatus comprising an inducing member and an induced member, the inducing member being supplied with a current in series with one or more of the generators, and with a current in shunt to the mains, and the induced member being so adjusted and connected as to control the prime mover of one of the generators in such a manner as to tend to hold the generators in synchronism, substantially as described.

In witness whereof I have hereunto set my hand this 2d day of December, 1895.

HORACE F. PARSHALL.

Witnesses:
B. B. HULL,
C. L. HAYNES.